United States Patent
Carley (10) Patent No.: US 12,400,010 B2
(45) Date of Patent: Aug. 26, 2025

(54) METHODS AND SYSTEMS FOR SECURE DATA ANALYSIS AND MACHINE LEARNING

(71) Applicant: Volkswagen Group of America Investments, LLC, Reston, VA (US)

(72) Inventor: David Neale Carley, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 942 days.

(21) Appl. No.: 17/009,094

(22) Filed: Sep. 1, 2020

(65) Prior Publication Data

US 2022/0067181 A1  Mar. 3, 2022

(51) Int. Cl.
  *G06F 21/62*  (2013.01)
  *G06F 18/21*  (2023.01)
  (Continued)

(52) U.S. Cl.
  CPC ...... *G06F 21/6218* (2013.01); *G06F 18/2115* (2023.01); *G06F 18/2148* (2023.01);
  (Continued)

(58) Field of Classification Search
  CPC ............ G06F 21/6218; G06F 18/2115; G06F 18/2148; G06F 18/217; G06F 21/6245;
  (Continued)

(56) References Cited

U.S. PATENT DOCUMENTS

| | | | | |
|---|---|---|---|---|
| 11,227,187 B1* | 1/2022 | Weinberger | ........... | G06T 7/0004 |
| 11,254,325 B2* | 2/2022 | Milton | ................... | G07C 5/008 |

(Continued)

FOREIGN PATENT DOCUMENTS

CN  110968887 A  4/2020

OTHER PUBLICATIONS

Author(s):Catak, F Title: Practical Implementation of Privacy Journal: MDPI [online]. Publication date: 2020.[retrieved on: Jul. 25, 2023 ]. Retrieved from the Internet: < URL:https://www.mdpi.com/2079-9292/9/2/229 > (Year: 2020).*

(Continued)

*Primary Examiner* — Gregory D. Moseley
(74) *Attorney, Agent, or Firm* — Fox Rothschild LLP (57) ABSTRACT

Methods and systems for secure machine learning are disclosed. The methods include, by a processor: receiving a labeled dataset for use in training the machine learning model, and transmitting a first cluster of training data selected from the labeled dataset to a training device. The first cluster includes less than a threshold amount of data that is determined to prevent the training device from deriving information about the labeled dataset from the first cluster. The methods further include receiving a trained machine learning model from the training device, evaluating the trained machine learning to determine whether the trained machine learning model satisfies an evaluation criterion, and encrypting the trained machine learning model if the trained machine learning model satisfies the evaluation criterion. The encrypted machine learning model can then be deployed to make predictions using live data.

33 Claims, 4 Drawing Sheets

(51) Int. Cl.
  *G06F 18/2115* (2023.01)
  *G06F 18/214* (2023.01)
  *G06N 20/00* (2019.01)
  *H04L 9/00* (2022.01)

(52) U.S. Cl.
  CPC ........... *G06F 18/217* (2023.01); *G06N 20/00* (2019.01); *H04L 9/008* (2013.01)

(58) Field of Classification Search
  CPC ....... G06N 20/00; H04L 9/008; H04L 9/0618; H04L 9/0894; G06V 10/7747
  See application file for complete search history.

(56) References Cited

U.S. PATENT DOCUMENTS

| | | | |
|---|---|---|---|
| 2017/0372226 A1 | 12/2017 | Costa et al. | |
| 2019/0244138 A1 | 8/2019 | Bhowmick et al. | |
| 2021/0299569 A1* | 9/2021 | Civin | G06N 3/08 |

OTHER PUBLICATIONS

Author(s):Liu Title: Security threats and defensive Journal: IEEE[online]. Publication date: 2018.[retrieved on: Dec. 14, 2023 ]. Retrieved from the Internet: <URL:https://ieeexplore.ieee.org/abstract/document/8290925> (Year: 2018).*

Author(s):Sun Title: Secure computation based homomorphic encryption in vehiclular ad hock networks Journal: MDPI[online]. Publication date: 2020.[retrieved on: Mar. 22, 2024]. Retrieved from the Internet: < URL:https://ieeexplore.ieee.org/abstract/document/8290925 > (Year: 2022).*

Author(s):Prema Title: Efficient secure aggregation on vanets using fully homomorphic encryption Journal: Springer[online]. Publication date: 2018.[retrieved on: Aug. 9, 2024]. Retrieved from the Internet: < URL: https://link.springer.com/article/10.1007/s11036-018-1095-y > (Year: 2018).*

Author(s):Li, T Title: Federated Learning Journal: IEEE[online]. Publication date: 2020.[retrieved on: Feb. 7, 2025]. Retrieved from the Internet: < URL: https://ieeexplore.ieee.org/abstract/document/9084352 > (Year: 2020).*

Author(s):Hao, M Title: Efficient Privacy Enhancved Federated Learning for Industrial AI Journal: IEEE[online]. Publication date: 2020.[retrieved on: Feb. 7, 2025]. Retrieved from the Internet: < URL: https://ieeexplore.ieee.org/abstract/document/8859260> (Year: 2020).*

Bost, et al., "Machine Learning Classification Over Encrypted Data," pp. 1-14, NDSS, 2015.

Xu, et al., "CrpytoNN: Training Neural Networks Over Encrypted Data," School of Computing and Information, University of Pittsburgh, arXiv:1904.07303v2 [cs.CR], Apr. 26, 2019, pp. 1-12.

Bost, et al., "Machine Learning Classification Over Encrypted Data," pp. 1-34, NDSS, 2015.

Fisher, K., "Machine Learning on Encrypted Data Without Decrypting It," Julia Computing, Nov. 22, 2019, pp. 1-14.

"Considerations for Sensitive Data Within Machine Learning Datasets," https://cloud.google.com/solutions/sensitive-data-and-ml-datasets, Dec. 20, 2019, pp. 1-10.

* cited by examiner

METHODS AND SYSTEMS FOR SECURE DATA ANALYSIS AND MACHINE LEARNING

BACKGROUND

Machine learning uses a number of statistical methods and techniques to create predictive models for classification, regression, clustering, manifold learning, density estimation and many other tasks. A machine learning model summarizes the statistical relationships found in raw data and is capable of generalizing them to make predictions for new data points. Machine learning models have been and are used for an extraordinarily wide variety of problems in science, engineering, banking, finance, marketing, and many other disciplines. Uses are truly limited only by the availability and quality of datasets. Building a model on a large dataset can take a long time, computing resources, and manual engineering efforts. Further, the time and resources necessary to build a model increases as the required quality or depth of the model increases. As such, machine learning models are valuable and need to be protected against theft and misappropriation.

The data being classified or used for training machine learning models is often sensitive and may come from multiple sources with different privacy requirements. Such data may also have value in view of the investment to acquire the datasets, perform preliminary processing, perform labeling, and/or store the dataset. In fact, many datasets (e.g., those used for controlling autonomous vehicles) are built after laborious processes that merge and clean multiple sources of data, and annotate the datasets with appropriate labels (often proprietary). Therefore, datasets are also based on proprietary or private data that owners do not want to share.

Finally, machine learning pipelines, models, and datasets have been found to be particularly vulnerable to adversarial perturbations. Adversaries are often able to fool the machine learning models by carefully introducing perturbations to a valid data sample. Such malicious attacks (e.g., insertion of corrupted data during training) can compromise the integrity of machine learning models and can have fatal consequences (e.g., autonomous vehicle crashes).

There remains a need to provide approaches that preserve the secrecy and integrity of machine learning models and/or datasets. This document describes methods and systems that are directed to addressing the problems described above, and/or other issues.

SUMMARY

In one or more scenarios, methods and systems for secure machine learning are disclosed. The system includes a processor and a non-transitory computer readable medium for storing instructions that when executed by the processor cause the system to execute the methods of this disclosure. The methods may include, by a processor: receiving a labeled dataset for use in training the machine learning model, and transmitting a first cluster of training data selected from the labeled dataset to a training device. The first cluster may include less than a threshold amount of data that is determined to prevent the training device from deriving information about the labeled dataset from the first cluster. The methods may further include receiving a trained machine learning model from the training device, evaluating the trained machine learning to determine whether the trained machine learning model satisfies an evaluation criterion, and encrypting the trained machine learning model if the trained machine learning model satisfies the evaluation criterion. The encrypted machine learning model may be deployed to make predictions using live data. Optionally, the encrypted machine learning may be stored.

In certain of such scenarios, the methods may also include transmitting a second cluster of training data to the training device that is selected from the labeled dataset for use in updating the trained machine learning model when the trained machine learning model does not satisfy the evaluation criterion, and receiving an updated trained machine learning model. The second cluster may also include less than the threshold amount of data. Optionally, the encrypted machine learning model may be stored as a checkpoint for the updated trained machine learning model. The trained machine learning model may be evaluated by: determining a plurality of evaluation metrics for the trained machine learning model, encrypting the plurality of evaluation metrics, and storing the encrypted plurality of evaluation metrics. Alternatively and/or additionally, the methods may include identifying a subset of the plurality of the evaluation metrics, and transmitting the subset of the plurality of the evaluation metrics to the training device for use in updating the trained machine learning. The subset may be identified to prevent the training device from deriving information about the trained machine learning model.

In some scenarios, the labeled dataset may be created by: receiving a corpus of unlabeled data, identifying a plurality of discrete data units from the corpus of unlabeled data, determining an access level associated with a labeling device, transmitting one or more of the discrete data units for labeling to a labeling device based on the access level, receiving the labeled data units from the labeling device, and encrypting the labeled data units. Optionally, identifying the plurality discrete data units may include identifying data units based on one or more of a type of unlabeled data, a desired level of privacy, an encryption mechanisms to be used for encrypting the labeled data units, a labeling work queue, an access level associated with a user of a labeling device, and/or one or more characteristics of the unlabeled data.

In various scenarios, the methods may also include selecting the first cluster of training data from the labeled dataset based on one or more of random sampling, required characteristics of data for training the machine learning model, required amount of data for training a machine learning model, an access level associated with a user of the training device, an access levels associated with the training device, history of data already transmitted to the training device, and/or types of data in the labeled dataset.

In some scenarios, the methods may include receiving a request for training a machine learning model. The request can include information relating to at least one of the following: required characteristics of data for training the machine learning model, required amount of data for training a machine learning model, an access level associated with a user of the training device, and/or an access levels associated with the training device.

In one or more scenarios, methods and systems for secure distributed machine learning are disclosed. The system includes a processor and a non-transitory computer readable medium for storing instructions that when executed by the processor cause the system to execute the methods of this disclosure. The methods may include, by a processor: receiving a request for training a machine learning model at a plurality of training devices, receiving a labeled dataset for use in training the machine learning model, transmitting a plurality of clusters of training data selected from the labeled dataset to the plurality of training device configured for training the machine learning model, and receiving a partially trained machine learning model from each of the plurality of training devices. Each of the plurality of clusters may have less than a threshold amount of data that is determined to prevent a training device from deriving information about the labeled dataset from that cluster. The methods may also include, for each of the plurality of the partially trained machine learning models: evaluating that partially trained machine learning model to determine whether that partially trained machine learning model satisfies an evaluation criterion, transmitting a second cluster of training data selected from the labeled dataset to a training device from which that partially trained machine learning model was received for use in updating the partially trained machine learning model if the partially trained machine learning model does not satisfy the evaluation criterion, and receiving an updated partially trained machine learning model. The second cluster may include less than the threshold amount of data.

In some scenario, the method may also include encrypting each of the partially trained machine learning models in response to determining that each of the plurality of partially trained machine learning models satisfies the evaluation criterion, and storing the encrypted partially trained machine learning models as checkpoints for the trained machine learning model.

In certain other scenarios, the methods may include integrating the plurality of partially trained machine learning model to create a trained machine learning model in response to determining that each of the plurality of partially trained machine learning models satisfies the evaluation criterion, encrypting the trained machine learning model, and deploying the encrypted machine learning model to make predictions using live data. Optionally, the methods may include determining a plurality of evaluation metrics for the trained machine learning model, encrypting the plurality of evaluation metrics, and storing the encrypted plurality of evaluation metrics. Additionally and/or alternatively, the method can include identifying a subset of the plurality of the evaluation metrics, and transmitting the subset of the plurality of the evaluation metrics to one or more of the plurality of training device for use in updating the trained machine learning. The subset may be identified to prevent the training device from deriving information about the trained machine learning model. The plurality of clusters of training data may be selected based from the labeled dataset based on at least one of the following: random sampling, required characteristics of data for training the machine learning model, required amount of data for training a machine learning model, an access level associated with a user of the training device, an access level associated with the training device, history of data already transmitted to the training device, and/or types of data in the labeled dataset.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

Specifically, systems and methods of the current disclosure provide the following advantages: (1) labeled data is kept confidential such that a labeling user/device or a training user/device has access to only subsets of labeled data at a given time based on access level; (2) parameters and artifacts of a machine learning models are kept confidential and not shared with the training users/devices; and (3) after the machine learning models are trained, they are encrypted and can be deployed publicly without causing any loss of privacy regarding the labeled data and/or the machine learning model.

Figure 1:
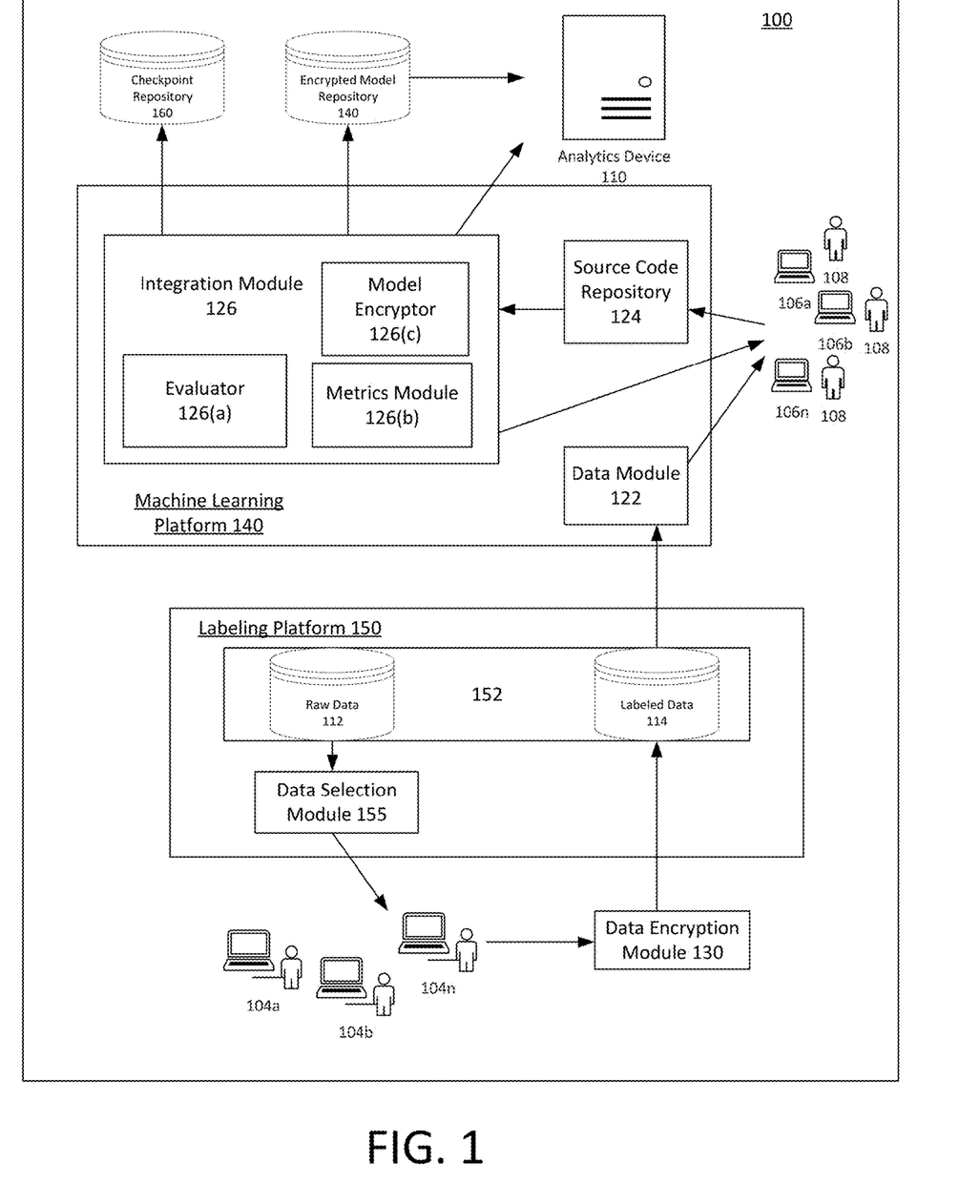
FIG. 1 illustrates a schematic diagram of a system for secure data analysis and labeling.

Referring now to FIG. 1, a block diagram illustrating a system 100 for secure machine learning training is shown. Various components of the system may communicate with each other over a communications network (not shown here) such as, without limitation, Internet, VPNs, Intranets, WAN, P2P networks, cellular networks, or other forms of network. Example protocols that can be leveraged for such communications include HTTP, HTTPS, SSL, SSH, TCP/IP, UDP/IP, FTP, SCP, WSDL, SOAP, or other types of well-known protocols. It should be appreciated that, although such protocols can be leveraged, it is contemplated that the data exchanged among the devices in the ecosystem/system will be further packaged for easy transport and consumption by the computing devices. The communications network may also implement protocols for secure communication such as an SSL (secure socket layer) or TLS layer (transport layer security) cryptographic protocol.

The system 100 includes a data labeling platform 150 including a data store 152 in communication with one or more labeling devices 104a-n, via a data selection module 155. The data store 152 may include a corpus of raw data (i.e., unlabeled or unclassified data) 112 stored in one or more databases. The corpus of raw data may include any now or hereafter known data types that can be used for training machine learning models such as, without limitation, 2D images, LIDAR sensor data, speech samples, audio samples, text samples, 3D images, location coordinates, or the like.

Labeling devices 104a-n can have access to the corpus, via a data selection module 155, in order to generate respective label sets that classify data points within the corpus. Multiple labeling device users, each with a unique and different perspective, can be particularly useful for generating useful label sets. In part, the knowledge, experience and biases of each user can lead to different generalizations, classifications and resulting labels. As an example, a research scientist may come up with a different label set for a corpus than an engineer for the same corpus.

In certain embodiments, the data selection module 155 may select or identify one or more discrete data units for labeling at the labeling devices 104a-n. The identification of the discrete data units may depend on the type of data, the desired level of privacy, subsequent encryption mechanisms to be used, labeling work queue (e.g., when labeling is performed by multiple users pulling each item to be labeled from a common queue), access level associated with a user of a labeling device, characteristics of the data, or the like. For example, for unlabeled data including images, a discrete data unit may include a subset of images with particular attributes (e.g., presence of a certain object, light conditions, time of image capture, equipment used for capture, etc.) that are sent to a labeling device for labeling or classification. Each subset of images may include, for example, one image, two images, three images, etc. depending upon the desired level of privacy, subsequent encryption mechanisms to be used, labeling work queue, etc. In this manner, the data selection module 105 only allows access to a permitted amount and/or type of raw data to a user and/or labeling device.

In an embodiment, each labeling device 104a-n may utilize systems, methods, and/or techniques now or hereafter known in the art to generate labeled data unit from each discrete data unit for training one or more machine-learning models. The labeling devices 104a-n may be implemented as one or more computing devices (separate physical and/or virtual), including a processor, non-transitory memory, a user interfaces (e.g., a graphical user interface (GUI)), and other now or hereafter known components required for labeling of data. In some embodiments, the labeling devices 104a-n may deny a user privileges such as printing and copying of the discrete data units (labeled or unlabeled).

The output data units from the labeling devices 104a-n may include identified and labeled objects that are depicted within the discrete data units (e.g., LIDAR point clouds), and may be stored in the data store 152 as labeled data 114 in one or more databases. In some embodiments, the labeled data 114 may include processed image data where each image or point cloud image frame may include a respective source image comprising the identifications and labels of particular objects in the image. Alternatively and/or additionally, the labeled data 114 may include indications of the associations between respective identified object/label pairs (e.g., as a relational database). The disclosure is not so limiting and the labeled data 114 may include labeled and identified objects in any other suitable format. While the labeled data 114 is shown as being stored in the data store 152 along with the corpus 112, this is not limiting, and the labeled data 114 may be additionally or alternatively be stored as desired in one or more other separate and distinct data storage entities (not shown).

In one or more embodiments, a data encryption module 130 may encrypt each labeled data unit generated by the labeling devices 104a-n before storage as labeled data 114. Encryption may be performed using any now or hereafter known methods or protocols (e.g., symmetric key encryption, asymmetric key encryption methods, etc.). Optionally, each labeled data unit may be encrypted using a unique encryption key/key pair, protocol, etc. to further enhance privacy protection of labeled data 114. In certain embodiments, the labeled data units may be encrypted using homomorphic encryption methods. With homomorphic encryption, certain computations can be performed even when the data is in encrypted form with guarantees to generate correct results. As such, the encrypted data may be used for training a machine learning model without performing decryption. It will be understood that the data encryption module 130 may be included in one or more of the labeling devices 104a-n. Other now or hereafter encryption methods are within the scope of this disclosure.

One or more portions of the labeled data 114 may be incorporated into or included in a training data set (as described below) for training one or more machine-learning models.

As shown in FIG. 1, the system also includes a secure machine learning platform 120 that receives encrypted labeled data 114 from the data store 152, and enables training devices 106a-n to access the labeled data 114, as described below. The machine learning platform 120 may include a data module 122, a source code repository 124, and an integration module 126.

The data module 122 may receive encrypted labeled data and decrypt it using a suitable protocol (e.g., using a decryption key). The data module 122 may also divide the received training data into subsets such as, without limitation, training data, test data, and validation data for use in training a machine learning model, testing a trained model, and validating a trained model, respectively.

The data module 122 may further divide the training data into clusters for transmission to one or more of the training devices 106a-n. Clusters may be formed based on, for example, random sampling, similarities between data units of a cluster, required characteristics of data for training a machine learning model at a training device (e.g., training a machine learning model to perform ground segmentation may require training data that includes a first number of ground images and a second number of non-ground images), required number of data units for training a machine learning model at a training device, access levels associated with a training device and/or a user 108 of the training device (e.g., certain training devices/users may have access to confidential information such as health information while other training devices/users may not), types of data in the training subset (e.g., 3D point clouds may be clustered based on the LIDAR sensor used to capture the point cloud data, resolution, etc.), type of information included in the training data (e.g., privacy sensitive information such as financial information, health information, etc. may only be shared with users having the right permission and/or in compliance with rules governing sharing of such data), or the like. The clustered training data may be transmitted to the corresponding training device for use in training a machine learning model at that training device. In this manner, users of the training devices 106*a-n* may get access to only a subset of the training data depending upon the corresponding access level and training data requirements, and never to the complete training data set at a particular time.

It should be noted that the machine learning model may be trained on the training data, one cluster at a time (at one or more training devices), such that all or substantially all of the training data is utilized for training the machine learning model, albeit in a manner that no individual training device/user has access to all the training data at a given time. The term "substantially all" is used to mean that the process accesses the majority of the training data clusters while any individual training device/user is unable to predict information about the training data by observing clusters of available training data and/or patterns of access to the training data.

Each training device 106*a-n* may utilize systems, methods, and/or techniques now or hereafter known in the art to generate trained machine-learning models. The training devices 106*a-n* may be implemented as one or more computing devices (separate physical and/or virtual), including a processor, non-transitory memory, a user interfaces (e.g., a graphical user interface (GUI)), and other now or hereafter known components required for computer programming and training/generation of machine learning models. For example, a training device may provide many features for authoring, modifying, compiling, deploying and debugging machine learning models, and may include a source code editor, a compiler and/or an interpreter, build automation tools, a debugger, and other programming tools. In some embodiments, the training devices 106*a-n* may maximize user productivity by providing tightly-knit components with similar user interfaces. In some embodiments, a training device may be dedicated to a specific programming language (e.g., PYTHON, C++, JAVA, R., JAVASCRIPT, or the like), allowing a feature set that most closely matches the programming paradigms of the language. Optionally, a training device may be a multiple programming language device.

In some embodiments, training devices 106*a-n* may use training data to train one or more implementations of machine learning algorithms such as, without limitation, ci-kit learn, Google®'s Artificial Intelligence including TensorFlow™, OpenAI™, Prediction IO™ Shogun™, WEKA, or Mahout™, Matlab, Amazon's Machine Learning, Microsoft's Azure Machine Learning, and SciKit-Learn, or the like. A machine learning algorithm may include different types of algorithms including implementations of a classification algorithm, a neural network algorithm, a regression algorithm, a decision tree algorithm, a clustering algorithm, a genetic algorithm, a supervised learning algorithm, a semi-supervised learning algorithm, an unsupervised learning algorithm, a deep learning algorithm, or other types of algorithms. Each algorithm can include a wide variety of possible model instructions that define the conditions under which training occurs. For example, the conditions could include a number of iterations or epochs to execute on the training data, learning rates, convergence requirements, time limits for training, initial conditions, sensitivity, specificity or other types of conditions that are required or optional. Convergence requirements can include first order derivatives such as "rates of change", second order derivatives such as "acceleration", or higher order time derivatives or even higher order derivatives of other dimensions in the attribute space of the data, etc. A user of the training device may provide hyperparameters that define how training is to be performed for the machine learning algorithm. The hyperparameters may be revised based on evaluation metrics for updating a trained machine learning model and/or for fine tuning (discussed below).

In some embodiments, a training device and/or a user 108 of a training device (e.g., a developer) may be associated with an access level or a permission level that may define the functionalities as well as data (e.g., training data, evaluation metrics, etc.) available at the training device and/or to the user via a training device. Users may be registered with the system, and may have login names, and passwords, or utilize other known security measures. A user's access or permission levels may be determined based on login credentials (e.g., user name, password, etc.) or other information that the user may provide before using a training device.

In certain embodiments, the training devices 106*a-n* can function within a secured virtual machine or secured container that is dedicated to specific programming tasks, which allows multiple, disparate users (e.g., developers) to work in parallel while also ensuring that each user's efforts remain secure from each other. For example, training devices 106*a-n* can be implemented via a Docker® container, where each user would have a separate instance of their own training device running on a server. In other embodiments, the training device can be constructed to process many sessions in parallel, where each session can be implemented as separate threads within the operating system (e.g., Linux, Windows, etc.) of the server.

Several developers may work on training same or different parts of a machine learning model, trained machine models may be updated regularly as new data comes in or utilizing a different range of data, and/or a trained machine learning model may be updated for improving convergence. As such, there will be multiple trained models created, each having differing predictive behaviors. These trained models may be saved in a source code repository 124. A saved trained model may be file(s) that include model data or model artifacts such as structure of a machine learning algorithm used for training, hyperparameters, learned parameters, coefficients, weights/coefficients for a particular ML algorithm (e.g., weights for a neural network), values serving as centroids for a model (e.g., a k-means clustering model), a shape of an equation, or other model-specific information allowing a model to be utilized (e.g., indicators of where tree splits exists for tree-based models, etc.). or the like. It should be noted that partially or fully trained models may be saved in the source code repository incrementally during the training phase and may be associated with a checkpoint when saved. Having regular checkpoints enables the training infrastructure/pipeline to be restarted without retraining on all of the data. It should be noted that trained model is ready for use in various applications (e.g., by an autonomous vehicle) when sufficient training has been made (e.g. convergence), and prior unusable versions of a model may also be saved in the source code repository.

An integration module 126 of the machine learning platform 152 may facilitate the integration of the development work of various developers and model versions (for both fully trained and partially trained models) created at different times, integrate the results, and check for convergence. The integration module 126 may perform integration using any or hereafter known methods for, for example, fusing different versions of a part of a machine learning model trained by different users.

In some embodiments, the integration module 126 can track and record one or more differences in configurations of different model versions in the source code repository 124. The tracked differences in the configurations can include differences in one or more sources of training datasets, one or more training datasets, one or more data features, or any combination thereof that were used to train the model. The integration module 126, therefore, is configured to track many different versions of machine learning models created over time, maintain them in a way that the developers may differentiate between the many variants (as checkpoints) and if necessary, even roll back or down-rev a given deployed model, such as in the case of having trained the model or updated a trained model with bad data or with new data which yields unacceptable performance results. Trained models can be considered a passive model or an active model. A passive model represents the final, completed model on which no further work is performed. An active model represents a model that is dynamic and can be updated based on various circumstances. In some embodiments, the trained actual model is updated in real-time, on a daily, weekly, bimonthly, monthly, quarterly, or annual basis. As new information is made available (e.g., to update model instructions, shifts in time, new training data, etc.), an active model will be further updated. In such cases, the active model carries metadata that describes the state of the model with respect to its updates. The metadata can include attributes describing one or more of the following: a version number, date updated, amount of new data used for the update, shifts in model parameters, convergence requirements, or other information. Such information provides for managing and integrating large collections of models over time, where each active model can be treated as a distinct manageable object. Each different model version in the source code repository 124 can be associated with one or more developer/analyst users, one or more application services, one or more training configurations, experimental metadata associated with the model, a version history of the model, evaluative metrics of the model, or any combination thereof. As such, a developer may retrieve a last trained model for performing updates or retraining. The integration module 126 can further track whether the models are currently in production, currently undergoing live testing, currently undergoing recurring training (e.g., with additional training data), idling, or any combination thereof.

In some embodiments, the integration module 126 may also include an evaluator 126(a) that may evaluate machine learning models (active or passive) and generate evaluation metrics. For example, the evaluation metrics can include quality metrics, such as an error rate of the machine learning model, a statistical distribution of the machine learning model, a latency of the machine learning model, a confidence level of the machine learning model (e.g., a level of confidence that the accuracy of the machine learning model), etc. The evaluator 126(a) can obtain the model data or files for a machine learning model from the source code repository 124. The evaluator 126(a) may build tests and/or perform verification and testing of models when they are deposited into the source code repository 124 and/or periodically. Such testing may include, for example, unit tests that test single piece of functionality of a model in isolation of others, integration tests that test whether various components or functionalities of a machine learning model work together as expected upon partial and/or full training of a model, quality tests that test new versions by checking their quality against the previous versions and/or over multiple versions, validation tests that test whether the model solves the problem at hand as well as metric such as accuracy, etc. In some embodiments, the evaluator 126(a) can also detect corruption of a machine learning model based on a computed evaluative metric of the machine learning model. The evaluator 126(a) may also determine whether convergence criteria of the model parameters set for each of the models is satisfied.

In some embodiments, the evaluator 126(a) may receive data (e.g., test data and/or validation data) from the data module 122 for performing the tests.

The evaluation metrics generated by the evaluator may be transmitted back to a training device 106a-n or developer, via a metrics module 126(b) and may be used to determine whether to adjust the training process and/or to stop the training process. For example, the evaluation metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the training device 106a-n, can modify the machine learning model being trained to include a new or modified algorithm, new or modified hyperparameter(s), fine-tune a model, perform bug fixes, revise various parameters, or the like. In certain embodiments, the metrics module 126(b) may only transmit a subset of the evaluation metrics to a training device in order to improve confidentiality of the training process and/or a trained model. For example, the metrics module 126(b) may only transmit evaluation metrics for a version that was trained by a particular user and/or using a particular training device. Optionally, the metrics module 126(b) may only transmit evaluation metrics for a portions of a model do not meet certain threshold requirements and that portion needs to be updated or retrained. In certain other embodiments, other metrics such as system metrics (e.g. CPU, Memory, GPU, Network, etc.); machine learning metrics (e.g., training accuracy, epoch count, loss, accuracy, test loss, test accuracy, etc.) may also be sent to a user.

Since the labeling device(s)/training device(s)/user(s) only have access to a subset of training data and a subset of evaluation metrics, neither the training data nor a previously trained model can be re-created by a user.

In certain embodiments, the integration module 126 may also include a model encryptor 126(c) configured to encrypt trained (fully or partially trained) machine learning models before storage in a model repository 140. The encryption may be performed using any now or hereafter known encryption protocols such as, without limitation, block cipher technologies (e.g., advanced encryption standard "AES", AES-256, data encryption standard "DES", skipjack, etc.), post quantum cryptography, random bit generation, or the like. The encrypted models may be stored temporarily (e.g., until provided to the user) or long-term. Optionally, the encrypted trained models may be deployed for performing predictions using a new data set as input, at an analytics device 110. Specifically, an analytics device 110 may use the model in "production" to make predictions or decisions against live input data. An unauthorized user may never get access to decrypted trained models and/or checkpoints. Rather, the system encapsulates the trained encrypted model progress (e.g., parameters, etc.) for providing to a user requiring access for, for example, further training or updating of a stored model to prevent such users from having direct access to a trained model. As such, user may not use a partially trained model in another application/manner beyond the authorized scope. Specifically, when an authorized user requests access to a trained model for further training and/or integration, the system may remove the encryption by rewriting the required data (e.g., the parameters that need to revised, the model structure, etc.) into a non-encrypted state (using for e.g., decryption keys without providing the decryption keys to a user) without providing the unencrypted model itself to the user.

Optionally, certain users with the requisite access defined by, for example, organizational policies, may be granted access to certain type of decrypted models and/or decryption keys for certain types of trained models In some embodiments, the model encryptor 126(c) may also regularly encrypt model data file(s) as the training process is ongoing at different times during the training process. Each set of model data files corresponding to a particular time or each set of model data files present in the source code repository 124 as of a particular time could be checkpoint models that represent different versions of a partially-trained machine learning model during different stages of the training process. Such encrypted checkpoint models may be stored in a checkpoint model repository 160. Accordingly, before training is complete, a user having the required permissions or access levels, via the training device(s) 106a-n can submit a deployment and/or execution request to deploy and/or execute a checkpoint version of a partially trained machine learning model (e.g., a machine learning model trained as of a certain stage in the training process) without having to perform any preceding steps for training the checkpoint model. Encryption of the checkpoint models preserves confidentiality of the training process as well as the machine learning models. As discussed above, typically a user cannot access a decrypted checkpoint model and is instead provided data encapsulating the checkpoint model for further processing such as refinement, updating, etc.

While the data labeling module 150, the data encryption module 130, the machine learning platform 120, the model repository 140, and the checkpoint model repository 160 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning pipeline) can communicate with one or more of the labeling devices 104a-n and training devices 106a-n.

Figure 2:
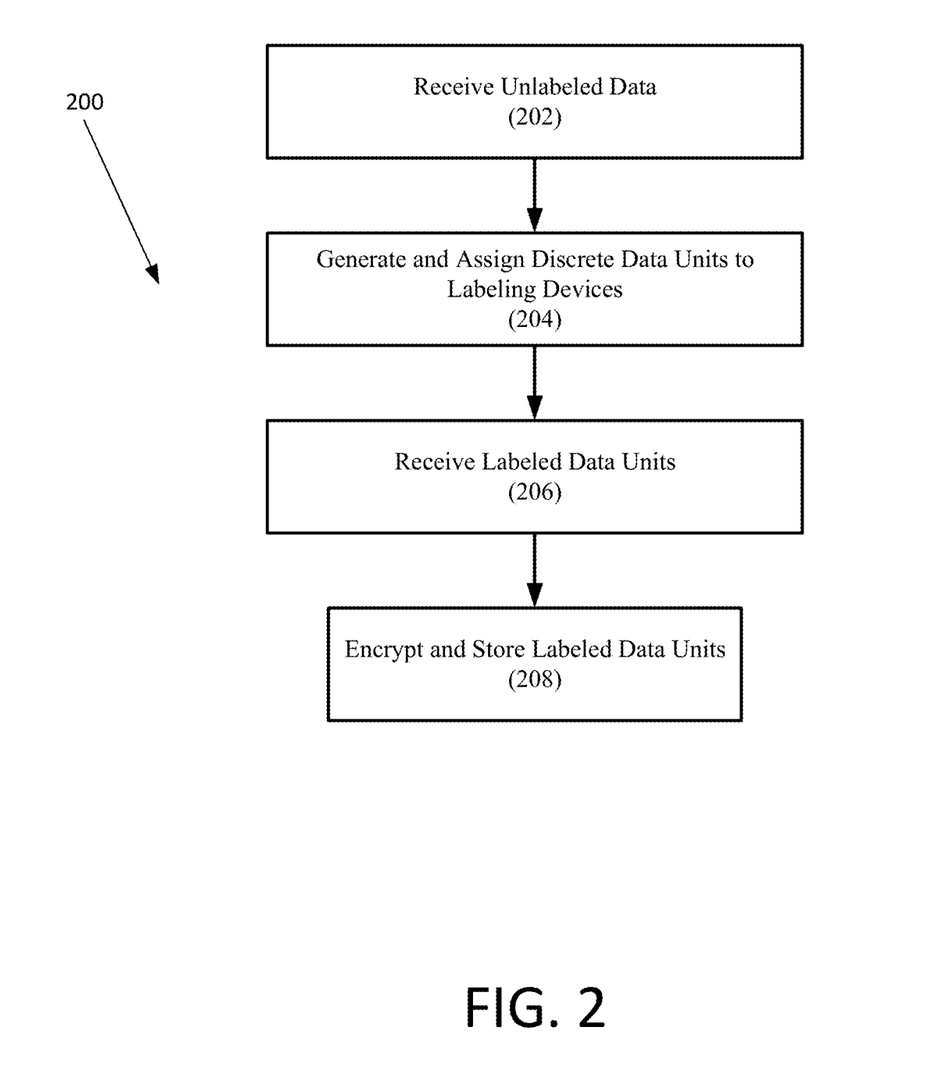
FIG. 2 illustrates a flowchart for an example method of labeling data for generating a machine learning model.

FIG. 2 is a flowchart illustrating an example method for secure labeling of data. The method described in FIG. 2 a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At 202, the system may receive a corpus of unlabeled data. Such data may include any now or hereafter known types of data that may be used for generating a machine learning model. At 204, the system may generate and assign discrete data units for labeling to different labeling devices and/or labeling users. The system may generate the discrete data units depending on, for example, the type of data, the desired level of privacy, subsequent encryption mechanisms to be used, labeling work queue, access level associated with a user of a labeling device and/or the labeling device, characteristics of the data, or the like. For example, for unlabeled data including images, a discrete data unit may include a subset of images with particular attributes (e.g., presence of a certain object, light conditions, time of image capture, equipment used for capture, etc.) that are sent to a labeling device for labeling or classification. Each subset of images may include, for example, one image, two images, three images, etc. depending upon the desired level of privacy, subsequent encryption mechanisms to be used, labeling work queue, etc. For assigning discrete data units to a labeling device, the system may first identify an access level associated with the labeling device and transmit the discrete data units that correspond with the identified access level. For example, certain users or labeling devices may not have access to privacy sensitive information, and the discrete data units assigned to such labeling devices or users may be identified to not include any privacy sensitive information.

The size of each discrete data unit may be such that a user in possession of the data unit cannot derive any meaningful information about the remaining corpus of data.

At 206, the system may receive from a user of a labeling device, labeled data units including labels suitably associated with the assigned data units. The system may encrypt the labeled data units (208) and store them for future usage during, for example, training or testing of a machine learning model.

Figure 3:
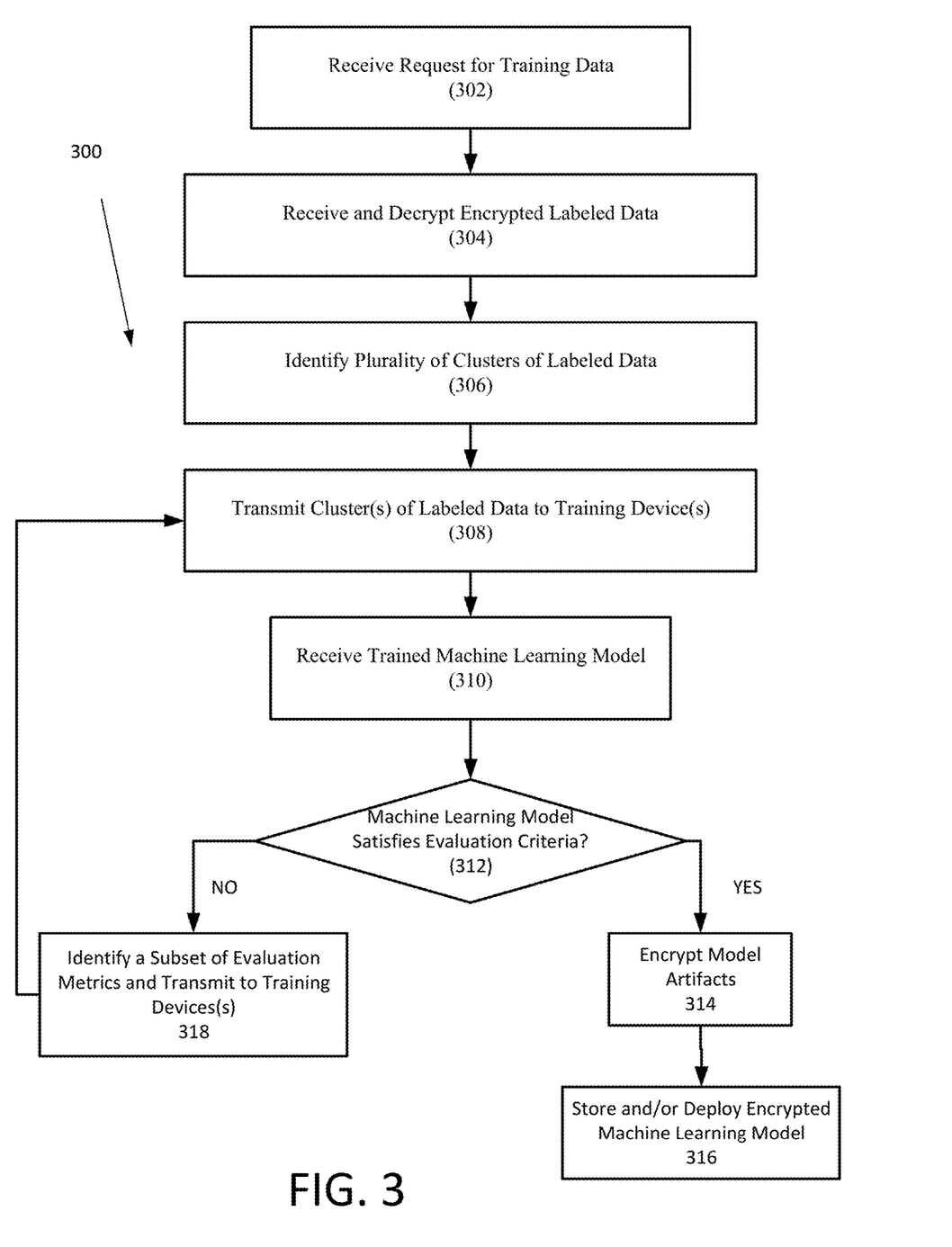
FIG. 3 illustrates a flowchart for an example method of training a machine learning model.

FIG. 3 is a flowchart illustrating an example method for secure training of a machine learning model. The method described in FIG. 3 a can be practiced by a system such as but not limited to the one described with respect to FIG. 1. While method 300 describes a series of operations that are performed in a sequence, it is to be understood that method 300 is not limited by the order of the sequence depicted. For instance, some operations may occur in a different order than that described. In addition, one operation may occur concurrently with another operation. In some instances, not all operations described are performed.

At 302, the system may receive a request for training data for training a machine learning model. The system may receive the request from a developer via, for examples, a training device. The request may include information such as, characteristics of training data required, quantities of training data, desired output of the training, access level associated with the user initiating the request, training devices and or users participating in training the machine learning model, or the like. The request may also include information relating to machine learning algorithms to be used, hyperparameters for the learning process, initialized weights, desired convergence criteria, output artifact information, or the like.

At 304, the system may receive encrypted labeled data and decrypt the data. At 306, the system may identify a plurality of clusters (i.e., subsets) of the decrypted data for use in training of the machine learning model. The clusters may be identified based on, for example, random sampling, similarities between data units of a cluster, required characteristics of data for training a machine learning model at a training device (e.g., training a machine learning model to perform ground segmentation may require training data that includes a first number of ground images and a second number of non-ground images), required number of data units for training a machine learning model at a training device, access levels associated with a user requesting the training data (e.g., certain training devices/users may have access to confidential information such as health information while other training devices/users may not), access levels associated with users/training devices to which the clusters will be transmitted for use, history of data already transmitted to users/training devices to which the clusters will be transmitted, types of data in the training subset (e.g., 3D point clouds may be clustered based on the LIDAR sensor used to capture the point cloud data, resolution, etc.), type of information included in the training data (e.g., financial information, health information, etc.), or the like. It should be noted that the clusters may be identified for each training device/user separately based on their respective properties or conditions.

The amount of data in each of the clusters is less than a threshold, where the threshold is determined such that a user in possession of a cluster of data cannot derive any meaningful information about the remaining labeled data (i.e., other clusters). The threshold may also be determined such that the cluster of data cannot be used to recreate a previously trained machine learning model without other information such as other clusters of data, model parameters of previously trained model, or the like. The threshold may be determined based on, for example, required characteristics of data for training a machine learning model at a training device, required number of data units for training a machine learning model at a training device, types of data in the training subset, history of data already transmitted to users/training devices to which the clusters will be transmitted, type of the machine learning algorithm being trained, processing capabilities of a training device, or the like. It should be noted that the threshold may be dynamically determined for each training device/user separately based on their respective properties, conditions, history, access level, etc. For example, the threshold of data for a training device and/or user may be a first amount of data at a first time and a second amount of data at a second time. For example, if a training device/use has already received some training data for training a machine learning model previously, the amount of data transmitted to that training device at a later time for training the same machine learning model may be less than the first time. In some embodiments, one or more clusters of data may collectively include the threshold amount of data.

At 308, the system may transmit the plurality of clusters to the training devices identified as participating in training of the machine learning model. As discussed above, the amount of training data transmitted to an individual training device or user at a particular time is less than a threshold. The system may continue transmitting clusters of data to the participating training devices until sufficient data has been transmitted for training. Training algorithms may define the amount of scope of data required for training. Moreover, available labeled data will be continually added to the system and made available for use for training.

At 310, the system may receive a trained machine learning model for evaluation and storage. The received model include model data such as structure of a machine learning algorithm used for training, hyperparameters, learned parameters, coefficients, weights/coefficients for a particular ML algorithm, etc; as well as metadata such as a version number, developer information, training device information, date of training and/or update, convergence requirements, or other information At 312, the system may evaluate and/or integrate the received trained machine learning model using unit tests, integration tests and/or validation tests to determine if the trained machine learning model satisfies various evaluation criteria (e.g., convergence rate, accuracy, etc.). If the model satisfies various evaluation criteria (312: YES), the system may encrypt (314) various model artifacts such as convergence results, evaluation metrics, the model data, checkpoints, and the model itself, and store them for further use and/or deployment for making predictions based on live data (316).

For example, a trained machine learning model may be deployed to an autonomous vehicle operating on a road that may use the trained model for navigation and control. For example, a machine learning model may be trained using the systems and methods described above to identify objects (e.g., other vehicles, people, obstacles, etc.) in the environment of the vehicle to determine a safe trajectory for navigation based on sensor data such as LIDAR data, camera images, RADAR data, or the like collected by the vehicle. The autonomous vehicle may also use a trained machine learning model to determine or estimate one or more features or properties of such objects (e.g., pose and shape) for a safe control and navigation strategy. In other examples, the methods and systems of the current disclosure may be used to train a machine learning model for predicting future locations, trajectories, and/or actions of one or more objects in the environment of an autonomous vehicle to aid the vehicle in making navigation and control decisions. As discussed above, the systems and methods of this disclosure preserve the confidentiality of both the data used to train a model as well as the model itself, and can be used by any system upon deployment without concerns for misappropriation and theft. Furthermore, the secure machine learning pipeline discussed above prevents malicious attacks that may tamper with the integrity of data used for training the model and/or the model because they only allow limited access to data such as labeled data and evaluation metrics as well provide encrypted model repository with checkpoints. Such secure machine leaning pipeline is critical for applications such as navigation of an autonomous vehicle where any faulty predictions because of malicious attacks could be fatal.

If the model satisfies various evaluation criteria (312: NO), the system may identify (318) a subset of the evaluation metrics (determined from performing the evaluations) that may be used to update the model, and transmit them to one or more training device(s). Steps 308-318 may be repeated using the identified subset of the evaluation metrics.

According to certain embodiments, the methodologies integrate with existing machine learning technologies and provides a continuous and secure integration infrastructure. In addition to creating, evaluating, tuning, and encrypting machine learning models from the ground up, disclosed embodiments are agnostic to a machine learning technology stack and programming language, and allow the management, evaluation, update, and maintenance of models produced by different technologies and environments in a privacy preserving manner.

Figure 4:
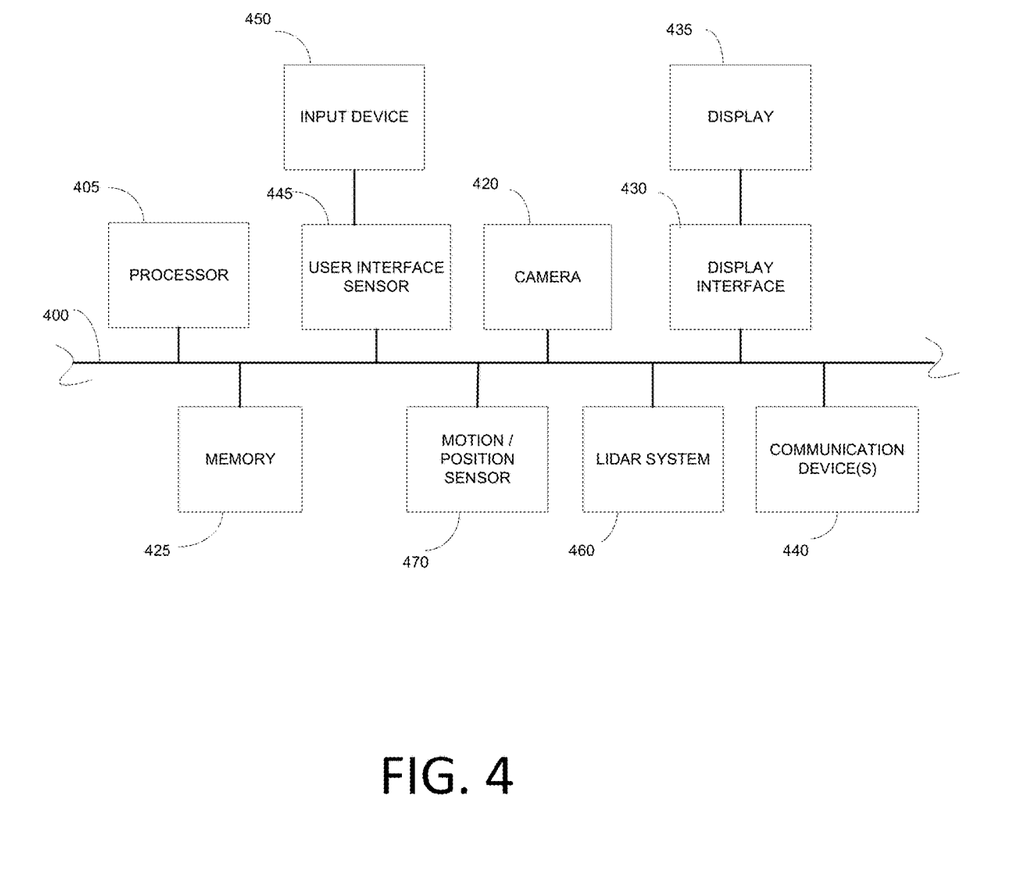
FIG. 4 is a block diagram of elements of a computing device on which the various systems and methods in this document could be implemented.

FIG. 4 depicts an example of internal hardware that may be included in any of the electronic components of the system, such as the controller (or components of the controller) of the autonomous vehicle, the control system, servers etc. described above. An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 430 may permit information from the bus 400 to be displayed on a display device 435 in visual, graphic or alphanumeric format. An audio interface and audio output (such as a speaker) also may be provided. Communication with external devices may occur using various communication devices 440 such as a wireless antenna, an RFID tag and/or short-range or near-field communication transceiver, each of which may optionally communicatively connect with other components of the device via one or more communication system. The communication device(s) 440 may be configured to be communicatively connected to a communications network, such as the Internet, a local area network or a cellular telephone data network.

The hardware may also include a user interface sensor 445 that allows for receipt of data from input devices 450 such as a keyboard, a mouse, a joystick, a touchscreen, a touch pad, a remote control, a pointing device and/or microphone. Digital image frames also may be received from a camera 420 that can capture video and/or still images. The system also may receive data from a motion and/or position sensor 440 such as an accelerometer, gyroscope or inertial measurement unit. The system also may receive data from sensors such as LIDAR system 460 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. A client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method for secure machine learning, the method comprising, by a processor:
   receiving, via a communication network, from a plurality of labeling devices, an encrypted labeled dataset for use in training a machine learning model;
   generating, by decrypting the encrypted labeled dataset, a labeled dataset;
   identifying an amount of decrypted data required to train the machine learning model based on at least properties or conditions of a training device, wherein the amount does not exceed a threshold value set to avoid loss of confidentiality of the labeled dataset;

transmitting, via the communication network, to the training device, a first cluster of training data in the identified amount;

receiving, via the communication network, from the training device, a trained machine learning model;

evaluating the trained machine learning model to determine whether the trained machine learning model satisfies an evaluation criterion;

in response to determining that the trained machine learning model satisfies the evaluation criterion, encrypting the trained machine learning model; and deploying, via the computing network, at an analytics device, the encrypted machine learning model to make predictions using live data.

2. The method of claim 1, further comprising:

in response to determining that the trained machine learning model does not satisfy the evaluation criterion, transmitting, via the computing network, to the training device, a second cluster of training data selected from the labeled dataset for use in updating the trained machine learning model, wherein the second cluster has less than a second threshold amount of data the threshold amount being determined to prevent the training device or the user of the training device from deriving information about the labeled dataset from the first cluster or the second cluster; and receiving, via the computing network, an updated trained machine learning model.

3. The method of claim 2, further comprising storing the encrypted machine learning model as a checkpoint for the updated trained machine learning model.

4. The method of claim 2, wherein evaluating the trained machine learning model comprises:

determining a plurality of evaluation metrics for the trained machine learning model;

encrypting the plurality of evaluation metrics; and storing the encrypted plurality of evaluation metrics.

5. The method of claim 4, further comprising:

identifying a subset of the plurality of the evaluation metrics; and transmitting, via the computing network, the subset of the plurality of the evaluation metrics to the training device for use in updating the trained machine learning, wherein the subset is identified to prevent the training device from deriving information about the trained machine learning model.

6. The method of claim 1, further comprising creating the labeled dataset by:

receiving a corpus of unlabeled data;

identifying a plurality of discrete data units from the corpus of unlabeled data;

determining an access level associated with a labeling device;

transmitting, based on the access level, one or more of the discrete data units for labeling to a labeling device;

receiving, from the labeling device, the labeled data units; and encrypting the labeled data units.

7. The method of claim 6, wherein the identifying the plurality discrete data units comprises identifying data units based on at least one of the following:

a type of unlabeled data;

a desired level of privacy;

an encryption mechanisms to be used for encrypting the labeled data units;

a labeling work queue;

an access level associated with a user of a labeling device; or one or more characteristics of the unlabeled data.

8. The method of claim 1, further comprising selecting the first cluster of training data from the labeled dataset based on at least one of the following:

random sampling;

required characteristics of data for training the machine learning model;

required amount of data for training a machine learning model;

an access level associated with a user of the training device;

an access levels associated with the training device;

history of data already transmitted to the training device; or types of data in the labeled dataset.

9. The method of claim 1, further comprising storing the encrypted machine learning model.

10. The method of claim 1, further comprising receiving, via the communications network, from a training device, a request for training a machine learning model, the request comprising information relating to at least one of the following:

required characteristics of data for training the machine learning model;

required amount of data for training a machine learning model;

an access level associated with a user of the training device; or an access levels associated with the training device.

11. A method for secure distributed machine learning, the method comprising, by a processor:

receiving, via the communications network, a request for training a machine learning model at a plurality of training devices;

receiving, via the communications network, from a plurality of labeling devices, an encrypted labeled dataset for use in training the machine learning model;

generating, by decrypting the encrypted labeled dataset, a labeled dataset;

identifying an amount of decrypted data required to train the machine learning model based on at least properties or conditions of the plurality of training devices, wherein the amount does not exceed a threshold value set to avoid loss of confidentiality of the labeled dataset;

transmitting, via the communications network, to each of the plurality of training devices configured for training the machine learning model, a unique cluster of training data of the identified amount;

receiving, via the communications network, from each of the plurality of training devices, a partially trained machine learning model;

for each of the plurality of the partially trained machine learning models:

evaluating that partially trained machine learning model to determine whether that partially trained machine learning model satisfies an evaluation criterion, in response to determining that the partially trained machine learning model does not satisfy the evaluation criterion, transmitting to a training device from which that partially trained machine learning model was received, a second unique cluster of training data selected from the labeled dataset for use in updating the partially trained machine learning model, wherein the second unique cluster has less than a second threshold amount of data, the second threshold amount being determined to prevent that training device from deriving information about the labeled dataset from that second unique cluster and based on properties or conditions of that training device, and receiving an updated partially trained machine learning model.

12. The method of claim 11, further comprising:

in response to determining that each of the plurality of partially trained machine learning models satisfies the evaluation criterion, encrypting each of the partially trained machine learning models; and storing the encrypted partially trained machine learning models as checkpoints for the trained machine learning model.

13. The method of claim 11, further comprising:

in response to determining that each of the plurality of partially trained machine learning models satisfies the evaluation criterion, integrating the plurality of partially trained machine learning model to create a trained machine learning model;

encrypting the trained machine learning model; and deploying, via the communications network, to an analytics device, the encrypted machine learning model to make predictions using live data.

14. The method of claim 13, further comprising:

determining a plurality of evaluation metrics for the trained machine learning model;

encrypting the plurality of evaluation metrics; and storing the encrypted plurality of evaluation metrics.

15. The method of claim 14, further comprising:

identifying a subset of the plurality of the evaluation metrics; and transmitting, via the communications network, the subset of the plurality of the evaluation metrics to one or more of the plurality of training device for use in updating the trained machine learning, wherein the subset is identified to prevent the training device from deriving information about the trained machine learning model.

16. The method of claim 15, further comprising selecting the plurality of clusters of training data from the labeled dataset based on at least one of the following:

random sampling;

required characteristics of data for training the machine learning model;

required amount of data for training a machine learning model;

an access level associated with a user of the training device;

an access level associated with the training device;

history of data already transmitted to the training device; or types of data in the labeled dataset.

17. A system for secure machine learning, the system comprising:

a processor;

a communications network; and a non-transitory computer readable medium comprising one or more programming instructions that when executed by the processor, cause the processor to:

receive, via the communications network, from a plurality of labeling devices, an encrypted dataset for use in training the machine learning model;

generate, by decrypting the encrypted labeled dataset, a labeled dataset;

identify an amount of decrypted data required to train the machine learning model based on at least properties or conditions of the training device, wherein the amount does not exceed a threshold value set to avoid loss of confidentiality of the labeled dataset;

transmit, via the communications network, to a training device, a first cluster of training data in the identified amount;

receive, via the communications network, from the training device, a trained machine learning model;

evaluate the trained machine learning to determine whether the trained machine learning model satisfies an evaluation criterion;

in response to determining that the trained machine learning model satisfies the evaluation criterion, encrypt the trained machine learning model; and deploy, via the communications network, at an analytics device, the encrypted machine learning model to make predictions using live data.

18. The system of claim 17, further comprising programming instructions that when executed by the processor, cause the processor to:

in response to determining that the trained machine learning model does not satisfy the evaluation criterion, transmit, via the communications network, to the training device, a second cluster of training data selected from the labeled dataset for use in updating the trained machine learning model, wherein the second cluster has less than a second threshold amount of data the threshold amount being determined to prevent the training device or the user of the training device from deriving information about the labeled dataset from the first cluster or the second cluster; and receive, via the communications network, an updated trained machine learning model.

19. The system of claim 18, further comprising programming instructions that when executed by the processor, cause the processor to store the encrypted machine learning model as a checkpoint for the updated trained machine learning model.

20. The system of claim 19, wherein the one or more programming instructions that cause the processor to evaluate the trained machine learning model comprise programming instructions that when executed by the processor, cause the processor to:

determine a plurality of evaluation metrics for the trained machine learning model;

encrypt the plurality of evaluation metrics; and store the encrypted plurality of evaluation metrics.

21. The system of claim 20, further comprising programming instructions that when executed by the processor, cause the processor to:

identify a subset of the plurality of the evaluation metrics; and transmit, via the communications network, the subset of the plurality of the evaluation metrics to the training device for use in updating the trained machine learning, wherein the subset is identified to prevent the training device from deriving information about the trained machine learning model.

22. The system of claim 17, programming instructions that when executed by the processor, cause the processor to create the labeled dataset by:
- receiving a corpus of unlabeled data;
- identifying a plurality of discrete data units from the corpus of unlabeled data;
- determining an access level associated with a labeling device;
- transmitting, based on the access level, one or more of the discrete data units for labeling to a labeling device;
- receiving, from the labeling device, the labeled data units; and
- encrypting the labeled data units.

23. The system of claim 22, wherein the one or more programming instructions that cause the processor to identify the plurality discrete data units comprise programming instructions that when executed by the processor, cause the processor to identify the data units based on at least one of the following:
- a type of unlabeled data;
- a desired level of privacy;
- an encryption mechanisms to be used for encrypting the labeled data units;
- a labeling work queue;
- an access level associated with a user of a labeling device; or
- one or more characteristics of the unlabeled data.

24. The system of claim 17, further comprising programming instructions that when executed by the processor, cause the processor to select the first cluster of training data from the labeled dataset based on at least one of the following:
- random sampling;
- required characteristics of data for training the machine learning model;
- required amount of data for training a machine learning model;
- an access level associated with a user of the training device;
- an access levels associated with the training device;
- history of data already transmitted to the training device; or
- types of data in the labeled dataset.

25. The system of claim 17, further comprising programming instructions that when executed by the processor, cause the processor to store the encrypted machine learning model.

26. The system of claim 17, further comprising programming instructions that when executed by the processor, cause the processor to receive a request for training a machine learning model, the request comprising information relating to at least one of the following:
- required characteristics of data for training the machine learning model;
- required amount of data for training a machine learning model;
- an access level associated with a user of the training device; or
- an access levels associated with the training device.

27. A system for secure distributed machine learning, the method comprising, by a processor:
- a processor;
- a communications network; and
- a non-transitory computer readable medium comprising one or more programming instructions that when executed by the processor, cause the processor to:
  - receive, via the communications network, from a plurality of labeling devices, a request for training a machine learning model at a plurality of training devices;
  - receive, via the communications network, an encrypted labeled dataset for use in training the machine learning model;
  - generate, by decrypting the encrypted labeled dataset, a labeled dataset;
  - identify an amount of decrypted data required to train the machine learning model based on at least properties or conditions of the training device, wherein the amount does not exceed a threshold value set to avoid loss of confidentiality of the labeled dataset;
  - transmit, via the communications network, to each of the plurality of training device configured for training the machine learning model, a unique cluster of training data in the identified amount;
  - receive, via the communications network, from each of the plurality of training devices, a partially trained machine learning model;
  - for each of the plurality of the partially trained machine learning models:
    - evaluate that partially trained machine learning model to determine whether that partially trained machine learning model satisfies an evaluation criterion,
    - in response to determining that the partially trained machine learning model does not satisfy the evaluation criterion, transmit, via the communications network, to a training device from which that partially trained machine learning model was received, a second cluster of training data selected from the labeled dataset for use in updating the partially trained machine learning model, wherein the second unique cluster has less than a second threshold amount of data, the second threshold amount being determined to prevent that training device from deriving information about the labeled dataset from that second unique cluster and based on properties or conditions of that training device, and
    - receive, via the communications network, an updated partially trained machine learning model.

28. The system of claim 27, further comprising programming instructions that when executed by the processor, cause the processor to:
- in response to determining that each of the plurality of partially trained machine learning models satisfies the evaluation criterion, encrypt each of the partially trained machine learning models; and
- store the encrypted partially trained machine learning models as checkpoints for the trained machine learning model.

29. The system of claim 27, further comprising programming instructions that when executed by the processor, cause the processor to:
- in response to determining that each of the plurality of partially trained machine learning models satisfies the evaluation criterion, integrate the plurality of partially trained machine learning model to create a trained machine learning model;
- encrypt the trained machine learning model; and
- deploy, via the communications network, at an analytics device, the encrypted machine learning model to make predictions using live data.

30. The system of claim 29, further comprising programming instructions that when executed by the processor, cause the processor to:
- determine a plurality of evaluation metrics for the trained machine learning model;
- encrypt the plurality of evaluation metrics; and
- store the encrypted plurality of evaluation metrics.

31. The system of claim 30, further comprising programming instructions that when executed by the processor, cause the processor to:
- identify a subset of the plurality of the evaluation metrics; and
- transmit, via the communications network, the subset of the plurality of the evaluation metrics to one or more of the plurality of training device for use in updating the trained machine learning,
- wherein the subset is identified to prevent the training device from deriving information about the trained machine learning model.

32. The system of claim 31, further comprising programming instructions that when executed by the processor, cause the processor to select the plurality of clusters of training data from the labeled dataset based on at least one of the following:
- random sampling;
- required characteristics of data for training the machine learning model;
- required amount of data for training a machine learning model;
- an access level associated with a user of the training device;
- an access level associated with the training device;
- history of data already transmitted to the training device; or
- types of data in the labeled dataset.

33. The method of claim 1, further comprising using the predictions made by the encrypted machine learning data using live data to control navigation of an autonomous vehicle.

* * * * *